Patented Aug. 8, 1950

2,518,130

UNITED STATES PATENT OFFICE 2,518,130

N-OXIDES OF TERTIARY AMINES AND PROCESS OF PREPARING SAME

Ralph L. Evans, Bay Shore, and Fred Linsker, New York, N. Y.; said Linsker assignor to said Evans No Drawing. Application April 26, 1945, Serial No. 590,511

14 Claims. (Cl. 260—250)

1

The present invention relates to N-oxides of tertiary organic bases and more particularly to N-oxides of heterocyclic bases such as phenanthrolines, quinoxalines, quinolines, isoquinolines, and pyridines.

Objects and advantages of the invention will be set forth in part hereinafter and in part will be obvious herefrom, or may be learned by practice with the invention, the same being realized and attained by means of the processes and compositions pointed out in the appended claims.

The invention consists in the novel processes and compositions herein shown and described.

Tertiary bases have been used for various purposes, including therapeutic purposes, and it has been found that the N-oxides of such bases are less toxic to the human system.

It has been proposed to prepare such N-oxides by using as a reagent perbenzoic acid in an organic solvent or solvents, but due to the instability of this reagent it had to be prepared immediately before use, so the process was not commercially practical.

It has also been proposed to prepare such N-oxides by treating the base, while suspended in an aqueous medium, with hydrogen peroxide, but this method also is not commercially feasible as it takes as long as several weeks for the formation of the N-oxides.

An object of the present invention is to provide new and improved processes for the production of N-oxides of tertiary organic bases. Another object is the provision of a commercially useful process for the production of such N-oxides.

A further object of this invention is to provide new N-oxides of tertiary organic bases.

According to the present invention, the tertiary organic base is dissolved in a lower fatty acid, resistant to oxidation, such as acetic or propionic acid, and the solution is treated with a concentrated solution of hydrogen peroxide. The solution thus formed is boiled and preferably refluxed, after which it is cooled, and preferably made alkaline. Upon standing a precipitate occurs which is filtered, washed, and, if desired, recrystallized.

Specifically, according to the present invention, the lower fatty acid used is glacial acetic acid, and the hydrogen peroxide solution concentration is 80–100 volume or higher, the 80–100 volume concentration being commercially available.

Highly efficient results are obtained by practicing the processes of the present invention. Yields as high as 70% to 90% of the theoretical yield of an N-oxide of a tertiary base are obtained. For example one equivalent weight of a tertiary base is dissolved in 800 grams of glacial acetic acid and 400 grams of hydrogen peroxide (80–100 volume) solution is added. The solution is then refluxed for two hours, cooled, di-

2 luted with water if desired, and made alkaline to precipitate the N-oxide. The precipitated N-oxides usually have a deeper color than the original base, as well as a higher melting point.

Although it is preferred to first add the tertiary organic base to the glacial acetic acid, and then add the hydrogen peroxide solution, one may add all three ingredients simultaneously to the reaction chamber, or one may add a mixture of the desired quantities of acid and peroxide to the base.

In most cases the N-oxides produced, according to the present invention, are insoluble in water, and can be readily precipitated when the reacted solution is rendered alkaline, for example, by sodium hydroxide. In the cases where the N-oxide produced is soluble in water, it may be recovered by the usual methods known to those skilled in the art.

In the practice of the present invention the following examples are preferred embodiments.

Example 1

6 grams of m-phenanthroline dihydrate are dissolved in 40 grams of glacial acetic acid, and 20 grams of hydrogen peroxide (80 volume) solution are added. The solution is boiled and refluxed for two hours. It is cooled to room temperature, diluted with 150 cc. of water, and made alkaline with 30% sodium hydroxide solution. The solution is then permitted to stand for three hours at 0° C., during which time a precipitate occurs which is filtered, and washed with water. This product is then recrystallized from boiling water to form fine yellow needles. It is m-phenanthroline di-N-oxide, and has a melting point of 192° C., and the following structural formula:

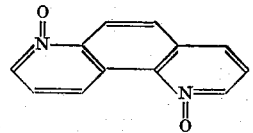

Example 2

5 grams of p-phenanthroline are dissolved in 40 grams of glacial acetic acid, and 20 grams of hydrogen peroxide (100 vol.) solution are added. The solution is boiled and refluxed for 2 hours. It is cooled to room temperature, diluted with 150 cc. of water, and made alkaline with an excess of 30% sodium hydroxide solution. The solution is refrigerated for at least several hours during which time a precipitate occurs which is filtered, washed with water, and recrystallized to form fine yellow needles. This product is p-phenanthroline di-N-oxide, having a melting point of 308° C., and the following formula:

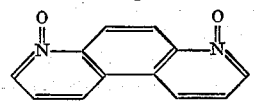

Example 3

5 grams 2,3-diphenylquinoxaline are dissolved in 40 grams of glacial acetic acid and 20 grams of hydrogen peroxide (100 vol.) solution are added. The solution is boiled and refluxed for two hours. It is cooled to room temperature, and poured into 500 cc. of water, and permitted to stand for three hours at 0° C., during which time a precipitate occurs. This precipitate is filtered, washed with water, and dried over calcium chloride in a vacuum desiccator. It is recrystallized from ethyl alcohol to form short, thick, yellow needles. This precipitate, 2,3-diphenylquinoxaline di-N-oxide, having a melting point of 210° C., and the formula

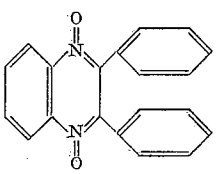

Example 4

5 grams of 8-hydroxyquinoline are dissolved in 40 grams of glacial acetic acid and 20 grams of hydrogen peroxide (100 vol.) solution are added. The solution is refluxed in an oil bath for two hours, cooled, and neutralized. It is permitted to stand at 0° C. overnight and a precipitate occurs which is filtered, washed with a small amount of water. The precipitate is then dried over calcium chloride in a desiccator as a result of which it appears in the form of long yellow needles, having a melting point of 132° C. This product is 8-hydroxyquinoline N-oxide and has the formula

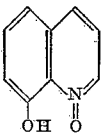

The N-oxide compounds produced in each of these four examples is a new compound. Each of these has valuable and useful characteristics not possessed by the tertiary base from which it is derived. In each instance the melting point of the N-oxide is higher than that of the tertiary base from which it is derived.

The invention in its broader aspects is not limited to the specific processes and compositions described but departures may be made therefrom within the scope of the accompanying claims without departing from the principles of the invention and without sacrificing its chief advantages.

What we claim is:

1. The process of producing an N-oxide of a tertiary organic base, comprising, reacting said base, in the presence of a lower fatty acid which is resistant to oxidation, with hydrogen peroxide.

2. The process of producing an N-oxide of a tertiary organic base, comprising, reacting said base, in the presence of a lower fatty acid which is resistant to oxidation, with a concentrated solution of hydrogen peroxide.

3. The process of producing an N-oxide of a tertiary organic base, comprising, reacting said base, in the presence of a lower fatty acid which is resistant to oxidation, with 80-100 volume hydrogen peroxide solution.

4. The process of producing an N-oxide of a tertiary organic base, comprising, reacting said base, in the presence of glacial acetic acid, with a concentrated solution of hydrogen peroxide.

5. The process of preparing m-phenanthroline di-N-oxide, comprising, reacting a solution of m-phenanthroline dihydrate in glacial acetic acid with a concentrated solution of hydrogen peroxide.

6. The process of preparing p-phenanthroline di-N-oxide, comprising, reacting a solution of p-phenanthroline in glacial acetic acid with a concentrated solution of hydrogen peroxide.

7. The process of preparing 2,3-diphenylquinoxaline di-N-oxide, comprising reacting a glacial acetic acid solution of 2,3-diphenylquinoxaline with a concentrated solution of hydrogen peroxide.

8. The process of preparing 8-hydroxyquinoline N-oxide, comprising, reacting a glacial acetic acid solution of 8-hydroxyquinoline with a concentrated solution of hydrogen peroxide.

9. The process of converting tertiary organic bases into N-oxides of said bases, which comprises heating said bases in the presence of glacial acetic acid and concentrated hydrogen peroxide.

10. As a new composition of matter an N-oxide derivative of a tertiary organic base selected from the group consisting of phenanthrolines, diphenylquinoxalines, and hydroxyquinolines.

11. The compound having the formula

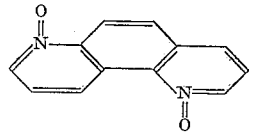

12. The compound having the formula

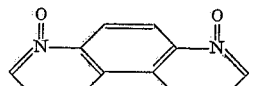

13. The compound having the formula

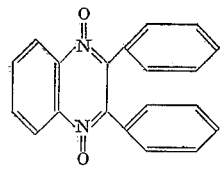

14. The compound having the formula

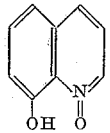

RALPH L. EVANS.
FRED LINSKER.

REFERENCES CITED

The following references are of record in the file of this patent:

UNITED STATES PATENTS

| Number | Name | Date |
|---|---|---|
| 2,178,496 | Schmidt | Oct. 1, 1939 |
| 2,416,658 | Van Arendonk | Feb. 25, 1947 |

OTHER REFERENCES

Annalen Der Chemie., vol. 286 (1895), pages 1–16.

Berichte Der Deutschen Chemischen Gesellschaft, vol. 59, page 1848 of 1926.

Journal of Organic Chemistry, July 1944 pages 302 through 309.